US009741159B2

(12) United States Patent
Hazel

(10) Patent No.: US 9,741,159 B2
(45) Date of Patent: Aug. 22, 2017

(54) GRAPHICS PROCESSING SYSTEMS

(71) Applicant: GEOMERICS LTD, Cambridge (GB)

(72) Inventor: Graham Hazel, Cambridge (GB)

(73) Assignee: GEOMERICS LTD, Cambridge (GB)

( * ) Notice: Subject to any disclaimer, the term of this patent is extended or adjusted under 35 U.S.C. 154(b) by 0 days.

(21) Appl. No.: 14/699,861

(22) Filed: Apr. 29, 2015

(65) Prior Publication Data

US 2015/0317825 A1 Nov. 5, 2015

(30) Foreign Application Priority Data

Apr. 30, 2014 (GB) .................................. 1407609.5

(51) Int. Cl.
G06T 15/60 (2006.01)
G06T 15/06 (2011.01)
G06T 15/50 (2011.01)
G06T 15/00 (2011.01)

(52) U.S. Cl.
CPC ............ *G06T 15/60* (2013.01); *G06T 15/005* (2013.01); *G06T 15/06* (2013.01); *G06T 15/506* (2013.01); *G06T 2215/12* (2013.01)

(58) Field of Classification Search
CPC ....... G06T 15/60; G06T 15/06; G06T 15/506; G06T 2215/12
USPC .................. 345/418–422, 426, 501
See application file for complete search history.

(56) References Cited

U.S. PATENT DOCUMENTS 6,535,209 B1 *  3/2003  Abdalla ................ G06T 15/005
                                                    345/418
6,760,024 B1 *  7/2004  Lokovic ................. G06T 15/06
                                                    345/421
7,868,901 B1 *  1/2011  Edmondson ............ G06T 11/40
                                                    345/422
8,026,915 B1    9/2011  Laur et al.
8,217,949 B1 *  7/2012  Carpenter ............... G06T 5/002
                                                    345/419
8,704,826 B1 *  4/2014  Hakura ................. G06T 15/005
                                                    345/419

(Continued)

OTHER PUBLICATIONS

GB Search Report dated Oct. 20, 2014 in Great Britain Patent Application No. GB1407609.5, 3 pages.

(Continued)

*Primary Examiner* — Kimberly A Williams
(74) *Attorney, Agent, or Firm* — Vierra Magen Marcus LLP

(57) ABSTRACT

To simulate the effect of shadows in an image being rendered a light source bounding frustum is produced for a tile for a light source, and used to determine a set of geometry for the tile that could cast a shadow in the tile. The determined set of geometry is then used to determine a light source visibility parameter for each sampling position in the tile by determining for each tile screen space sampling position, whether rays cast between the tile sampling position and a set of sampling positions representing the light source would intersect occluding geometry or not. The determined number of visible light source sampling positions for each tile sampling position is used to determine a light source visibility parameter value for each tile sampling position, and the determined light source visibility parameters are then used to modulate the light source when shading the geometry.

26 Claims, 9 Drawing Sheets

(56) References Cited

U.S. PATENT DOCUMENTS

| | | | |
|---|---|---|---|
| 2004/0239673 A1* | 12/2004 | Schmidt | G06T 15/60 345/426 |
| 2004/0263511 A1* | 12/2004 | West | G06T 15/40 345/421 |
| 2005/0134588 A1* | 6/2005 | Aila | G06T 15/60 345/426 |
| 2007/0247472 A1 | 10/2007 | Tong et al. | |
| 2013/0187947 A1* | 7/2013 | Barringer | G06T 11/40 345/629 |
| 2013/0241938 A1* | 9/2013 | Gruber | G06T 11/40 345/501 |
| 2013/0328873 A1* | 12/2013 | Harada | G06T 15/405 345/422 |
| 2014/0176529 A1* | 6/2014 | Meixner | G06T 11/40 345/419 |
| 2014/0300619 A1* | 10/2014 | Hasselgren | G06T 15/005 345/589 |
| 2015/0042655 A1* | 2/2015 | Gautron | G06T 15/60 345/426 |
| 2016/0093098 A1* | 3/2016 | Andersson | G06T 7/0071 345/426 |
| 2016/0203635 A1* | 7/2016 | Wyman | G06T 15/60 345/426 |
| 2016/0260249 A1* | 9/2016 | Persson | G06K 9/6267 |

OTHER PUBLICATIONS

Martin, Sam "Real Time Area Lighting Now and Next" Geomerics, AltDevConf 2012, 51 pages.

Burns, et al. "The Visibility Buffer: A Cache-Friendly Approach to Deferred Shading" Journal of Computer Graphics Techniques, pp. 55-69, vol. 2, No. 2, 2013.

Sintorn, et al. "An Efficient Alias-free Shadow Algorithm for Opaque and Transparent Objects using per-triangle Shadow Volumes" Proceedings of the 2011 SIGGRAPH Asia Conference, Article No. 153, 10 pages.

Sintorn, et al. "Per-Triangle Shadow Volumes Using a View-Sample Cluster Hierarchy" Proceedings of the 18th meeting of the ACM SIGGRAPH Symposium on Interactive 3D Graphics and Games, 2014, pp. 111-118.

\* cited by examiner

GRAPHICS PROCESSING SYSTEMS

BACKGROUND

The technology described herein relates to graphics processing systems and in particular to methods of and apparatus for taking account of the effect of shadows when rendering images for display.

When rendering images, such as output frames, for display in graphics processing systems, it is often desirable to be able to take account of the effect of shadows in the scene being rendered. Various rendering techniques have therefore been developed to try to do this.

One such technique is so-called "shadow mapping". In this technique a "shadow map" that is indicative of the depth from the light source to the object that is casting the shadow at each sampling point is derived (e.g. in a first rendering pass), and then used when rendering the output frame to determine if the sampling positions are in shadow or not (by comparing the shadow map depth with the depth of the geometry at the sampling point in question to determine if the geometry is in front of or behind the shadow casting object (and so will be in shadow or not)).

While shadow maps can be an effective technique for allowing the effect of shadows to be taken account of when rendering images that include a single, "point" light source, the need to first prepare, and then store and use, a shadow map in these arrangements means that using shadow maps can become very expensive (e.g. in terms of memory and bandwidth resources), e.g. if there are plural light sources and/or area light sources (i.e. light sources that are not single points, but have an "area") that need to be considered.

Another known technique for rendering the effect of shadows is to use "shadow volumes". In this technique, for each shadow-casting object, a "shadow volume" that encloses the space that is blocked from the light by the object in question is generated. The shadow volumes are then tested against sampling positions, and a sampling position is considered to be in shadow if it lies within any of the shadow volumes.

However, shadow volumes can again become very expensive when, e.g., considering plural, and/or area, light sources.

The Applicants believe therefore that there remains scope for improved techniques for rendering shadows in graphics processing systems.

BRIEF DESCRIPTION OF THE DRAWINGS

A number of embodiments of the technology described herein will now be described by way of example only and with reference to the accompanying drawings, in which.

Like reference numerals are used for like components where appropriate in the drawings.

DETAILED DESCRIPTION

Figure 1:
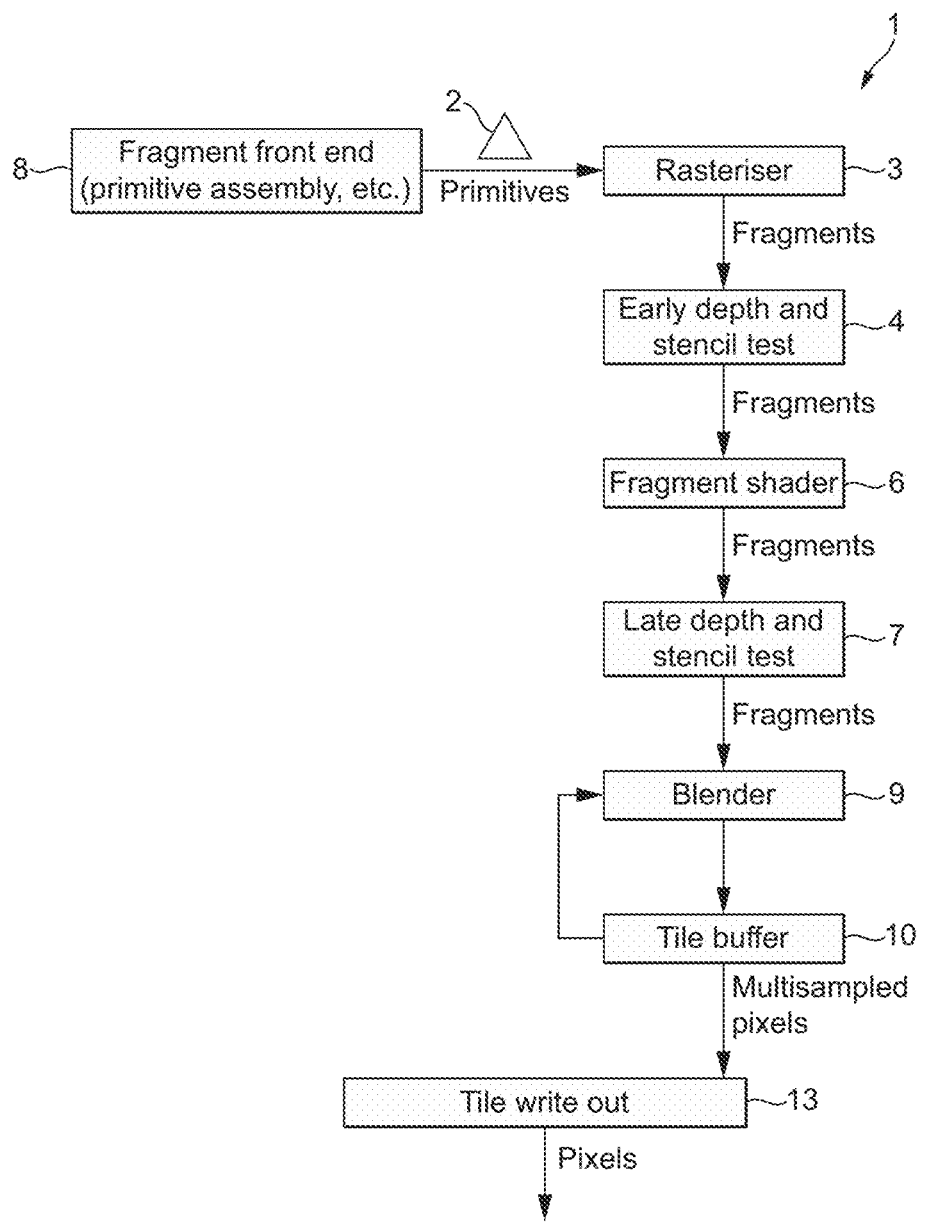
FIG. 1 shows schematically a graphics processing pipeline that can be operated in the manner of the technology described herein.

A first embodiment of the technology described herein comprises a method of operating a graphics processing system when rendering a frame for output that includes a light source that could cast shadows, the method comprising:

for at least one region of the frame being rendered:

determining a set of the geometry to be processed for the frame that could cast a shadow from a light source to be considered for the frame for the region of the frame being rendered; and for each sampling position of a set of sampling positions for the region of the frame being rendered, determining a light source visibility parameter using the determined set of geometry.

A second embodiment of the technology described herein comprises a graphics processing system comprising:

a plurality of processing stages, including at least a rasteriser that rasterises input primitives to generate graphics fragments to be processed, each graphics fragment having one or more sampling points associated with it, and a renderer that processes fragments generated by the rasteriser to generate output fragment data;

and wherein the graphics processing system is configured to, when rendering a frame for output that includes a light source that could cast shadows:

for at least one region of the frame being rendered:

determine a set of the geometry to be processed for the frame that could cast a shadow from a light source to be considered for the frame for the region of the frame being rendered; and for each sampling position of a set of sampling positions for the region of the frame being rendered, determine a light source visibility parameter using the determined set of geometry.

The technology described herein is directed to a method of and apparatus for taking account of the effect of shadows when rendering frames for output. In the technology described herein, a set of geometry that could cast a shadow in a given region of the output frame is determined and then used to determine a light source visibility parameter for each sampling position of the frame region. As will be discussed further below, this light source visibility parameter can then be used to simulate the shadow effect when rendering the frame for output.

As will be discussed further below, the technology described herein can provide a technique for handling the effect of shadows that can be used for more complex "shadowing" situations, such as the presence of plural and/or area lights without, for example, the significantly increased expense that is incurred when using shadow maps or shadow volumes in those situations. Indeed, in its embodiments at least, the technology described herein can significantly reduce the memory and bandwidth required for handling complex shadowing situations as compared with conventional shadow handling techniques (whilst still maintaining satisfactory rendering quality).

The region of a frame that is being considered for the operation in the manner of the technology described herein can be any desired and suitable region of the frame. It would be possible to consider the frame as a whole (in which case there would be a single region comprising the entire frame), but in an embodiment the frame is divided into plural smaller regions, and at least one, and in an embodiment plural (and potentially each), of those regions is processed in the manner of the technology described herein. In this case, the processing in the manner of the technology described herein may be performed for each region that the frame is divided into, or it may be performed for some but not all of the regions that the frame is divided into. Where a frame is processed as multiple frame regions, the processing is in an embodiment done on a region-by-region basis.

The regions of the frames that are considered in the technology described herein can be any suitable and desired regions of the frames. In an embodiment, each frame region represents a different part (region) of the frame in question. Each region should ideally represent an appropriate portion (area) of the frame, such as a plurality of sampling positions within the frame. Suitable region sizes could be, e.g., 8×8, 16×16, 32×32 sampling positions in the frame. The frame regions are in an embodiment regularly sized and shaped, in an embodiment in the form of rectangles (including squares). However, this is not essential and other arrangements could be used if desired.

Where each frame is already sub-divided into regions for the purpose of its processing, then in an embodiment, each region of the frame that is considered in the manner of the technology described herein corresponds to a region that the frame is otherwise divided into for processing purposes. This could be the case where, for example, the graphics processing system is a tile-based system and the graphics processing, etc., is to be carried out in a tile-based fashion, for example using a tile-based graphics processing unit.

Thus, in an embodiment, each region of the frame that is considered in the manner of the technology described herein corresponds to one or more tiles of the frame. In an embodiment, each region that is considered corresponds to a (single) tile that a graphics processor or system that is generating the frame in question operates on and produces as its output (i.e. the regions are the tiles that the frames are divided into for processing (rendering) purposes), although other arrangements, such as each region comprising a plurality of tiles or a part of a tile, would be possible if desired.

In these arrangements of the technology described herein, the processing (rendering) tiles that the frames are divided into can be any desired and suitable size or shape, but are in an embodiment of the form discussed above (thus in an embodiment rectangular (including square), and in an embodiment 8×8, 16×16 or 32×32 sampling positions in size).

The set of sampling positions of a region of the frame being rendered that a light source visibility parameter is determined for can be any desired and suitable set of sampling positions.

In an embodiment, the set of sampling positions of a region of the frame being rendered that a light source visibility parameter is determined for comprises the set of sampling positions that will be processed for the frame region when producing (rendering) the (e.g., and in an embodiment final) output for the frame region (thus, a light source visibility parameter value is in an embodiment determined for each (screen space) sampling position of the region of the frame (e.g. tile) being rendered).

However, it would also be possible to determine the light source visibility parameters at a different, e.g., and in an embodiment, lower, resolution than the rendered output for the frame region (and in one embodiment, that is what is done). In this case, the determined light source visibility parameters are in an embodiment appropriately upscaled (e.g.) to the resolution of the rendered output for the frame region when they are used when generating the rendered output for the frame region (e.g. the output, rendered, tile). Where this is done, the upsampling (e.g.) is in an embodiment done in a manner that will tend to preserve contrast at edges in the image (e.g. by using a bilateral filter). In this case, a light source visibility parameter could, e.g., be determined for some but not all of the (screen space) sampling positions of the frame region (e.g. tile) in question.

Where the output frame is divided in plural regions, e.g. processing tiles, then while it would be possible to process each such region, e.g. tile, in the manner of the technology described herein, in an embodiment that is done for selected regions only, and in an embodiment only for regions that meet certain, in an embodiment selected, in an embodiment predefined, criteria or conditions. In an embodiment only those regions that it is determined could be lit by the light source in question are processed for the light source in the manner of the technology described herein. Thus, the light source is in an embodiment culled against the frame regions to identify the frame regions that could be lit by the light source (to identify the frame regions that contain geometry that could be affected by the light source).

Thus in an embodiment, the frame being rendered is divided into (and is to be processed as) plural distinct regions, and it is first determined which of the regions that the frame has been divided into could be lit by the light source being considered, and then some or all (and in an embodiment each) of those determined frame regions are processed in the manner of the technology described herein.

The frame regions that could be lit by the light source being considered can be determined as desired. In an embodiment it is determined whether a (and each) region is within the light's volume of influence (with regions that are outside the volume of influence not being processed in the manner of the technology described herein). It would also or instead (and in an embodiment also) be possible for regions whose geometry all faces away from the light source to be discarded from processing in the manner of the technology described herein.

For a frame region that falls to be processed in the manner of the technology described herein, the set of geometry for the region that could cast a shadow from the light source can be determined in any suitable manner. The geometry that is considered is in an embodiment in the form of graphics primitives, and in an embodiment triangles, but this is not essential, and other forms of geometry could be used and considered, if desired.

In an embodiment this is done by determining a bounding frustum or frustums that (together) contain all the visible geometry in the frame region and the light source being considered. Such a frustum can be constructed as desired (e.g. using any suitable known technique for determining such frustums), for example, and in an embodiment, by determining a minimum and a maximum depth value of the geometry, as seem from the camera (view point) for the frame region (knowledge of the camera position and orientation will then allow a bounding volume for the geometry to be reconstructed) and then using that and, e.g., the area of the frame region and of the light source in question, to construct a bounding frustum (or frustums) for the light source in question. This can be done in view (camera) space or in world space.

In one embodiment, a single bounding frustum that contains all the visible geometry in the frame region and the light source being considered is generated for the frame region.

In another embodiment, plural bounding frustums are generated for a frame region. In this case, each bounding frustum should contain some of (but not necessarily, and in an embodiment not, all of) the geometry in the frame region and the light source, with all the bounding frustums together containing all the visible geometry in the frame region. Using plural bounding frustums may be appropriate where there are large depth and/or spatial position discontinuities in the geometry for a region, for example where the geometry can be split into disjoint groups that are themselves local but relatively far apart from each other.

The set of geometry that could cast a shadow from the light source is in an embodiment then determined by determining for each geometry object (e.g. primitive, e.g. triangle), whether or not it intersects the light source bounding frustum (or at least one of the bounding frustums, where plural bounding frustums are being used) for the region. Any geometry that is determined to intersect the (or any one of the) light source bounding frustum(s) is in an embodiment then included in the determined set of geometry that could cast a shadow (affect the shadow being cast) in the frame region, but any geometry that is determined not to intersect the (or any of the) bounding frustum(s) is in an embodiment not included in the determined set of geometry that could affect the shadow being cast. (This is on the basis that to be able to cast a shadow in the frame region in question, the geometry object (e.g. primitive) must intersect a bounding frustum that includes the light and the geometry for the frame region.)

The determination of whether any geometry for a frame region intersects a light source bounding frustum can be performed as desired, and in any suitable manner. For example, it would be possible simply to test each object, e.g. primitive (e.g. triangle) for a frame region against the bounding frustum(s) in turn.

However, in an embodiment, more efficient testing mechanisms are used. For example, a hierarchical testing arrangement, in which larger size representations of geometry objects, and/or of the frame regions and/or of the light source bounding frustums are first tested, and then progressively sub-divided and tested again (if required), could be used to make the testing process more efficient (and in an embodiment, this is what is done).

Thus, in an embodiment, the light source bounding frustum intersection testing process operates to iteratively test a light source bounding frustum against progressively smaller representations of the frame geometry down to a given, in an embodiment selected, in an embodiment predetermined, minimum geometry object (which is in an embodiment a primitive), discarding any geometry representations that do not intersect the light source bounding frustum (at least in part), and then including in the set of geometry any geometry found to intersect at least in part the light source bounding frustum.

In such arrangements, there is in an embodiment a separate hierarchy for the frame region light source bounding frustums and a separate hierarchy for the geometry.

In the case of the geometry, large static meshes, for example, could be pre-processed to determine bounding volumes for sub-sets of their primitives, which could then be intersection tested (with the bounding volumes being progressively sub-divided as required).

For the frame regions, light source bounding frustums for larger groupings of frame regions could first be tested and then the individual frame regions light source bounding frustums tested (if required). For example, the light source bounding frustums for individual frame regions (e.g., tiles) could be used to construct bigger light source bounding frustums for sets of plural frame regions, e.g., for 2×2, 4×4 and/or 8×8 neighbouring frame regions (tiles).

In one such arrangement, higher-level (larger size) geometry representations (e.g. bounding volumes) are first intersection tested against higher-level (larger size) frame region light source bounding frustums (such as, and in an embodiment, light source bounding frustums for sets of 2×2 (and/or 4×4, 8×8, etc.) neighbouring frame regions (tiles)), then any higher level geometry representations (e.g. bounding volumes) that are not culled by the first stage are intersection tested against the appropriate individual frame region light source bounding frustums, and, finally, the individual geometry objects (e.g. primitives) for the higher level geometry representations that have not yet been culled are intersection tested against the individual frame region light source bounding frustums.

Other arrangements would, of course, be possible.

The light source visibility parameter that is determined for a sampling position in the frame region being considered from the determined set of geometry can be any desired and suitable parameter that can be used to provide the desired shadowing effect in the rendered output frame.

In one embodiment it is a value that can be (and that is to be) used to modulate the effect of the light source at the sampling position in question to provide (and to represent or simulate) the shadowing effect at that sampling position. In this case, the light contribution from the light source if it were completely unoccluded is in an embodiment multiplied by the light source visibility parameter to give a "net" light contribution from the light source to the frame region sampling position in question when rendering (shading) the frame region.

In another embodiment, the light source visibility parameter for a (and for each) frame region sampling position indicates directly the "net" light contribution from the light source to the frame region sampling position in question (and thus is to be used as the "net" light contribution from the light source to the frame region sampling position in question when rendering (shading) the frame region).

Other arrangements would, of course, be possible.

In an embodiment, the light source visibility parameter for a sampling position is representative of (is indicative of), and dependent upon, how much light from the light source will fall upon the sampling position in question. This parameter can then be used to simulate the effect of the light source at the sampling position in question when the output frame is rendered.

In one embodiment, a single light source visibility parameter that is to be applied to all the colour channels is determined for a (and for each) frame region sampling position. In another embodiment, separate light source visibility parameters are derived for different colour channels. In this case, a separate light source visibility parameter is in an embodiment derived for each colour channel (although the separate light source visibility parameters may be determined to have the same value).

The light source visibility parameter for a sampling position can be determined as desired and in any suitable manner from the determined set of geometry (e.g. primitives) for the frame region.

In an embodiment, it is estimated how much light from the light source will fall upon the frame region sampling position in question. This can be estimated as desired, but in an embodiment, it is in an embodiment based, at least in part, on whether and how much of the light source is visible at the frame region sampling point in question, i.e. whether any of the geometry in the determined set of geometry that could cast a shadow in the frame region will occlude the light source from the sampling position.

Whether and how much of the light source is visible at a frame region sampling point can be determined in any suitable and desired manner, but in an embodiment this is done by testing whether, for each of one or more sampling positions representing the position of the light source, a ray cast between the frame region sampling position in question and the light source sampling position would intersect geometry in the determined set of geometry that could cast a shadow at the frame region sampling position in question (i.e. could be occluded by any geometry in the determined set of geometry that could cast a shadow in the frame region or not).

In this process, the light source could be represented by a single sampling position (and in one embodiment, this is the case). This may be appropriate where the light source is a point source.

In an embodiment, the light source is represented by plural sampling positions. In this case, it is in an embodiment then tested for plural of (and in an embodiment for each of) the plural sampling positions that represent the light source, whether a ray cast between the frame region sampling position in question and the light source sampling position would intersect any geometry in the determined set of geometry that could cast a shadow at the frame region sampling position (i.e. could be occluded by any geometry in the determined set of geometry that could cast a shadow in the frame region or not).

Using a plurality of sampling points to represent the light source allows the operation in the manner of the technology described herein to be used for, and to represent, area lights (i.e. light sources that have an area) in an efficient and effective manner. In this case, the light source is in an embodiment represented by up to a few hundred sampling positions, e.g. 60-600, 64, 128, 256 or 512, sampling positions.

Where plural sampling positions are used to represent a light source then the sampling positions can be arranged in any suitable and desired fashion. In an embodiment, the sampling positions are arranged as an array of sampling positions that represents (and corresponds to) the light source in question. Thus, for an area light, for example, an array of sampling positions that covers (and corresponds to) the area of (occupied by) the light source is in an embodiment used. It would also be possible to use a three-dimensional array of sampling positions (and in an embodiment, this is done). This could be used, e.g., for and to represent light sources that have a volume.

The array of sampling positions should, and in an embodiment does, correspond to the shape (e.g. area or volume) of the light source in question. Thus, for rectangular area lights, a rectangular array of light source sampling positions is in an embodiment used. It would also be possible to use irregularly shaped arrays of light source sampling positions for light sources that have irregular (non-rectangular or non-cuboid) shapes, or, e.g., a rectangular (or cuboid, for light shapes with volume) array could be used in combination with a suitably shaped mask for light sources that have irregular (non-rectangular or non-cuboid) shapes.

The sampling positions are in an embodiment regularly positioned (regularly spaced), as that will then facilitate the testing process. Thus, for example, a regular, e.g. rectangular, array (grid) of sampling positions could be used (and in one embodiment is used).

The Applicants have recognised that using a regular rectangular grid array of light source sampling positions could result in aliasing (and thus loss of quality), for example in the (potentially) common case of rectangular area lights and occluding geometry that are both aligned to co-ordinate axes.

Thus, in an embodiment, a sampling position array that is designed to reduce the effect of (or the risk of) aliasing is used. Any suitable sampling position layout that can reduce the risk of aliasing can be used for this. For example, and in an embodiment, a varying offset could be added to each row of sampling positions and/or to each column of sampling positions, and/or the rows and/or columns of the sampling position grid need not be (and in an embodiment are not) aligned with the light source that they are being used to represent. In an embodiment a rotated grid sampling position layout is used.

The testing of whether a light source sampling point will be visible from the frame region sampling position can be done in any desired and suitable manner. It is in an embodiment done using a rasterisation operation. (The Applicants have recognised in this regard that determining which light source sampling positions are visible from a frame region sampling position using the determined set of "shadow-casting" geometry is effectively a rasterisation operation, with the frame region sampling position as the viewpoint and the light source sampling positions as the render target).

Thus, in an embodiment, testing of whether a light source sampling positions will be visible from the frame region sampling position is done by rasterising the geometry (e.g. primitives) in the determined set of shadow-casting geometry for the frame region onto a render target that corresponds to the light source sampling positions (with the frame region sampling position as the viewpoint).

Being able to use a rasterisation operation for this testing process allows the testing process to be carried out in an efficient and relatively quick manner. For example, as the same set of geometry will be considered for each frame region sampling position, the memory access and thread execution pattern should be very coherent. Also, if regularly-spaced rows of light source sampling positions are used, the occlusion for each row of light source sampling positions can be determined together in scanline fashion (and then written to the render target with appropriate bit shift and logical OR operations, for example).

Also, as the data stored for each render target sampling position (i.e. for each light source sampling position) can be, and is in an embodiment, relatively small (e.g. only 1-bit, as will be discussed further below), the size of the render target for each frame region sampling position being tested can be relatively small (e.g. only a few hundred bits) and therefore, e.g., fit into registers (thereby avoiding, e.g., the need to use external (main) memory for this process).

Any suitable and desired rasterisation technique can be used for this testing process. It would also be possible to identify and use opportunities to speed up and/or stop (finish) the rasterisation process, if desired. For example, if a single primitive that occupies the entire light source bounding frustum is identified, that could then be used to deem that the light source is occluded for the entire frame region, with all subsequent testing for that frame region for that light source (or at least for the light source bounding frustum in question) then being skipped.

In an embodiment, where the light source being considered is a point source (i.e. is represented using only a single light source sampling position), then the testing of whether a light source sampling position would be visible from the frame region sampling positions is done by rasterising the geometry (e.g. primitives) in the determined set of shadow-casting geometry for the frame region onto a render target that corresponds to the frame region sampling positions (with the light source sampling position as the viewpoint). This may be more efficient, e.g. than rasterising from each frame region sampling position onto a 1×1 render target representing the light source sampling position. In this case, the rasterisation output will effectively indicate for each frame region sampling position, whether the point light source is visible at that frame region sampling position (or, for example, how much light from the light source falls at the frame region sampling position in question (as will be discussed further below)).

The light source sampling position occlusion testing can be used to provide the light source visibility parameter to be used for the frame region sampling position in question in any desired and suitable manner.

In one embodiment, it is determined whether each light source sampling position is occluded or not. In this case the output (render target) of the light source sampling position occlusion testing for a frame region sampling position can be, and is in an embodiment, an indication of whether each light source sampling position is occluded for the frame region sampling position in question, for example, and in an embodiment, in the form of a single bit per light source sampling position that can be set (or not) to indicate whether that light source sampling position is occluded or not. In this case, the render target output of the testing process may have 1-bit per light source sampling position and so may, e.g., and in an embodiment, only require a few hundred bits (such that it will, e.g., fit in registers and so can be generated and consumed locally, without the need to, e.g., export it to external, e.g. main, memory).

In these arrangements, the light source visibility parameter for the frame region sampling position in question is in an embodiment then determined, at least in part, from the indicated number of light source sampling positions that were found to be visible (or found to be occluded) by the testing process. For example, and in an embodiment, the number of visible light source positions (e.g. the number of set bits) can be counted and then used as (or used, at least in part, to derive) the light source visibility parameter for the frame region sampling position in question. Thus, in an embodiment, the light source visibility parameter for each frame region sampling position is based on the number of visible light source sampling positions at the frame region sampling position in question.

In one embodiment, the light source visibility parameter for each frame region sampling position is, or corresponds to, the ratio (the proportion) of the visible light source sampling positions to the total number of light source sampling positions at the frame region sampling position in question. The overall "contribution" of the light source if it were completely unoccluded could then be (and in an embodiment is) multiplied by this ratio to simulate the effect of shadows at the frame region sampling position in question.

It would also be possible to derive more sophisticated measures of the light falling on the frame region sampling position from the light source sampling position occlusion testing, if desired. This may result in more processing for the occlusion testing and larger render target outputs from the occlusion testing, but should provide a more accurate representation of the shadows that are being cast.

In one such embodiment, rather than solely determining the ratio (proportion) of visible light source sampling positions, for each non-occluded light source sampling position, a measure of the amount of light that will fall on the frame region sampling position from the light source sampling position in question is determined. In this case, in an embodiment an intensity parameter (value) is determined for the region of the light source that the unoccluded (visible) light source sampling position relates to. In this case, the, e.g., intensity parameter values could e.g., be stored for the light source sampling position in question in the render target output of the testing process, but in an embodiment, a running total intensity value is maintained as successive light source sampling positions are processed.

In these arrangements, the ratio of the determined overall amount of light falling on the frame region sampling positions to the amount of light that would fall on the frame region sampling point if the light source were completely unoccluded could then, e.g. be determined, and used as the light source visibility parameter for the light source sampling position in question (and then, e.g., the overall "contribution" of the light source if it were completely unoccluded could then be (and in an embodiment is) multiplied by this ratio to simulate the effect of shadows at the frame region sampling position in question. Alternatively, the determined overall amount of light falling on the frame region sampling position in question could be used as, or used at least in part to derive the light source visibility parameter for the frame region sampling position in question, and then, e.g., used directly as the amount of light from the light source falling on the frame region sample position in question when rendering (shading) the sampling position.

The amount of light that is falling on the frame region sampling position could be determined as desired. It could, for example, be, and in an embodiment is based on the distance (depth) of the frame region sampling position from the light source sampling position. This may be particularly appropriate for light sources that have "volume".

The amount of light that is falling on the frame region sampling position could also or instead be, and in an embodiment is also or instead, based on the amount of light that the light source sampling position in question is producing (in this case, each light source sampling position in an embodiment has associated with it an illumination parameter whose value indicates the amount of light being produced by that part of the light source). This may be useful where a light source's output can vary across its surface (or volume).

In this case, the light source visibility parameter for a frame region sampling position is in an embodiment then determined from the indicated amount of light falling on the frame region sampling position from the light source sampling positions that were found to be visible at the frame region sampling position in question. For example, and in an embodiment, the amounts of light for each visible light source sampling position could be summed or integrated, and then used as (or used to derive) the light source visibility parameter for the frame region sampling position in question.

This will then allow the light source visibility parameters for the frame region sampling positions to take into account which parts of the light source are visible at a frame region sampling position, not just how much of the light is visible.

The, e.g., proportion (ratio) of visible light source sampling positions for, or the sum of the amount of light falling on, a frame region sampling position could be determined after the visibility testing render target output has been generated, or it could, e.g., be determined as the testing process proceeds, e.g., and in an embodiment, by maintaining a running count or total as each light source sampling position is tested.

It would also be possible to take account of other factors in the light source sampling position occlusion testing if desired. In one embodiment, this testing also takes account of transparency ($\alpha$ values) associated with the geometry objects being considered. For example, where "punch through" alpha (transparency) is being used, an alpha look-up to determine if the geometry in question will be opaque or transparent at the position in question in the output frame could be, and is in an embodiment, included in and used for the light source sampling position visibility test.

It would also be possible, e.g., to use a transparency ($\alpha$) value associated with an occluding object to modulate the determined amount of light falling on the frame region sampling position (and in an embodiment, this is done). For example, the a value could be used as or to derive a multiplying factor. This would then allow the effect of (occluding) semi-transparent surfaces to be taken account of more accurately. In one such embodiment, each colour channel is treated (considered) separately (thus a separate light source visibility parameter is derived for each colour channel). This will then allow the effect of (occluding) semi-transparent coloured (tinted) surfaces to be taken account of more accurately.

The above process should be repeated for each frame region sampling position that a light source visibility parameter is to be determined for. As discussed above, the light source visibility parameter for a sampling position is in an embodiment a value (or values) that can be used to modulate the light source in a subsequent rendering pass to simulate the effect of the shadows at the sampling position in question. Each light source visibility parameter is accordingly, in an embodiment, a value between 0 and 1 that can be used to modulate the light source. Other arrangements would, of course, be possible.

The determined light source visibility parameters for the frame region sampling positions can be used as desired to simulate the (determined) effect of the shadows in the rendered output frame region. As discussed above, the determined light source visibility parameters are in an embodiment used to modulate the light source at the sampling positions when determining the output, rendered, colour to be used for the frame region (screen space) sampling positions.

Thus, in an embodiment, the method of the technology described herein further comprises (and the graphics processing system of the technology described herein is further configured to) using the determined light source visibility parameters for the region of the frame being rendered when rendering an output version of the frame region, and in an embodiment to modulate the effect of the light source in question at each sampling position of the output version of the frame region. As discussed above, this could include upscaling the determined light source visibility parameters to give a light source visibility parameter for each sampling position of the output version of the frame region.

The determined light source visibility parameters for a frame region could be provided as desired for use when rendering the frame region. For example, they could be written to (stored in) a frame region light source visibility buffer that is then, e.g., read (and used) in the (or a) subsequent rendering pass. In one embodiment, this is what is done. In this case, the light source visibility buffer could, e.g., be cached and retained "on-chip" for use in a subsequent rendering pass, or it could, e.g., be written out to main memory and then read back in when it is to be used.

In one such embodiment, the light source visibility buffer is retained "on-chip" for use in a subsequent rendering pass, e.g., and in an embodiment, by caching it and/or storing it in registers of the graphics processing pipeline. (As discussed above, the technology described herein facilitates such operation because the data required to store the light source visibility parameters for each frame region sampling position is relatively small.)

Storing the light source visibility buffer "on-chip" means that the light source visibility data can be handled and processed "locally" without the need, e.g., to write data structures out to main memory and then read them back in again. This further saves both power and memory bandwidth.

This said, it would also be possible, if desired, to write out the determined light source visibility parameters and the light source visibility buffer to main memory for later use (and to then read the values back in from main memory when they are to be used). In this case, it would, for example, be possible to write out and save the parameter values at a different, e.g. lower, resolution, and then to, e.g., upscale the saved values to a higher resolution when they are to be used.

Because the light source visibility parameters are determined per sampling position (on a sampling position basis), it would also be possible to determine a light source visibility parameter for a sampling position and then use it "immediately" in the or a subsequent, e.g., final, rendering pass for the sampling position in question.

Indeed, it is an important advantage of the technology described herein that because it determines a light source visibility parameter (i.e. the effect of shadows) for sampling positions, that then facilitates using the determined parameters in the rendering process for the sampling positions in question without the need to otherwise process the "shadow-indicating data" or to otherwise retain that data whilst other "shadow-indicating data" is generated. Also, the light source visibility parameter for one sampling position can be and is determined in a "self-contained" manner (such that it will be "finished" before the light source visibility parameter of other sampling positions is determined (and without needing to wait for the light source visibility parameter of other sampling positions to be determined).

Thus, in an embodiment, once a light source visibility parameter is determined for a frame region sampling position, that determined light source visibility parameter is used (immediately) to render the frame region sampling position in question. Thus, in an embodiment, the light source visibility parameter determination for a sampling position is combined with (integrated into) the subsequent shading (rendering) process for the sampling position that uses the determined light source visibility parameter. This will then remove the need to store a light source visibility buffer.

Thus, in an embodiment, the method of the technology described herein comprises, and the system of the technology described herein is configured to, determine a light source visibility parameter for a sampling position of a frame region and then use the light source visibility parameter to determine a rendered output value for a (and in an embodiment for the) sampling position of the frame region, before determining a light source visibility parameter for another (e.g., and in an embodiment, the next) sampling position of the frame region. Correspondingly, in an embodiment, the method of the technology described herein comprises, and the system of the technology described herein is configured to, determining light source visibility parameters for sampling positions of a frame region and then using the light source visibility parameters to determine rendered output values for sampling positions of the frame region in turn.

As will be appreciated from the above, in those arrangements where the determined light source visibility parameters are used directly when rendering the frame region sampling position in question, or a light source visibility buffer is retained "on-chip", the light source visibility parameters will be both generated and used locally in the graphics processing pipeline, without the need to (and avoiding the need to) write any data to and read any data from main memory. This then avoids the need to use any main memory bandwidth, etc., for the light source visibility parameters (i.e. the light source visibility parameters can be produced and consumed "locally"). This can then allow the effect of shadows to be taken account of in a much more bandwidth conservative way by eliminating the need for reads and writes to external memory. This in turn can lead to increased system performance and reduced power consumption.

Thus, in an embodiment, the determined light source visibility parameters are not written to main memory, but are used within the graphics processing system (pipeline) without writing them to main (external) memory.

Although the technology described herein has been described above with particular reference to the processing of a single frame region, it will be appreciated that the process should be, and is in an embodiment, repeated for each region (e.g. tile) that the frame has been divided into (at least where a light source could cast shadows).

Similarly, the process is in an embodiment repeated for plural frames of a sequence of frames, e.g. and in an embodiment, for each frame of a sequence of frames to be rendered that includes a light source or sources that could cast shadows.

Also, although the technology described herein has been described above with particular reference to the processing in respect of a given light source, it will be appreciated that the technology described herein can be extended to an arbitrary number of lights. In this case, the process of the technology described herein to determine light source visibility parameters should be, and in an embodiment is, repeated for each light source that could cast a shadow in a frame region. A separate set of light source visibility parameters (e.g. light source visibility buffer, where used) is in an embodiment determined for each light source being considered. In this case, the initial determination of the set of geometry that could cast a shadow, could, e.g., and in an embodiment, be amortized by considering all the lights at once.

The technology described herein may, e.g., consider (test) the geometry in "world-space" (and in one embodiment, this is what is done). However, depending on what hardware is available and what results are required, it would be possible to also or instead consider the geometry in (perform computations in) screen space, if desired.

It would also be possible to use the techniques of the technology described herein to determine the effect of shadows cast by moving objects (i.e. to account for "motion blur"). The technology described herein facilitates this, because it provides, inter alia, a memory and bandwidth efficient mechanism for taking account of the effect of shadows.

To account for motion blur, multiple sets of light source visibility parameters for a frame region (and for the light source in question) are in an embodiment determined, for each of plural respective different instances in time (e.g. over the time period between frames), with the positions of the geometry in the frame being varied depending upon which instance in time the light source visibility parameter determination is being performed for and the motion of the object(s) in question. In other words, plural light source visibility parameters for a (and for each) frame region sampling position are in an embodiment determined, based on the known motion of objects in the frame being rendered. (Thus, instead of the geometry being assumed to have a single location in the frame, light source visibility parameters are determined for plural different positions of the geometry in the frame, based on the motion of the geometry (during the time interval for a frame).)

In this case, it would, for example, be possible to determine light source visibility parameters for the geometry's start and end positions within a frame, and/or one or more intermediate positions within the frame could also be considered, if desired. It would also be possible, e.g., to take the geometry's start position within the frame and its velocity to determine respective time interval positions for the geometry.

The determined respective light source visibility parameters for each instance in time (geometry position) could then be, and are then in an embodiment, combined to provide an appropriately "combined" light source visibility parameter for each frame region sampling position that will accordingly take better account of the motion of the geometry during the time interval of the frame. For example, an average of the "time-spaced" light source visibility parameters for a frame region sampling position could be determined for each frame region sampling position, and then used as the light source visibility parameter for the frame region sampling position in question when rendering the frame.

The sampling at the instances of time during the time interval of the frame could be done, e.g. discretely, or by using a continuous collision detection algorithm.

It would also be possible to perform more sophisticated light source visibility parameter determinations to, for example, take account of transparent surfaces, if desired. In this case, the method could be extended to cope with transparency by generating a minimum geometry depth value and a maximum geometry depth value for each frame region sampling position, rather than a single depth value.

For example, in an embodiment, to handle transparent surfaces, a depth buffer for the opaque geometry is first determined, and then the translucent geometry is rendered to generate a new depth buffer, representing the position of the translucent geometry. These two depth buffers could then be used as a minimum and maximum depth for each frame region sampling position (which interval will contain all of the geometry of interest). The light source visibility parameter operation can then be performed as described above, generating the light source bounding frustums based on the respective depth buffer values. (In this case, if there is no opaque geometry covering a frame region sampling position, the maximum depth value could, e.g., be set to the maximum scene extent, or, for example, a minimum and a maximum depth for the translucent geometry could be determined.)

It would also be possible to determine depths of multiple layers of translucent geometry, if desired, and to accordingly determine plural light source bounding frustums for identifying whether, and which, respective layers of translucent geometry occlude the light source at a given frame region sampling position. This would then allow multiple light source visibility parameter values, e.g. representative of respective translucent geometry layers, to be determined for the frame region sampling positions, and therefore allow more sophisticated simulation of the effect of shadows to be provided, for example taking account of multiple translucent layers in the geometry.

For example, multiple "layer" light source visibility parameters could be used to determine how the light passes through the layers of translucent geometry, and, e.g., how much light passes into an object. In this case, all the translucent geometry (layers) could be considered, or only a selected number, e.g., of layers could be considered (for example by depth sorting the geometry and only considering the first few objects (layers) closest to the light source).

It would also be possible, e.g., to render (shade) multiple versions of a frame region, e.g. one version that considers only solid (opaque) geometry, and then one or more other versions that consider translucent geometry, and then combine (e.g. blend) the multiple versions of the frame region in an appropriate manner to provide the output version of the frame region.

The technology described herein can be used in any suitable and desired graphics processing system (in general any system where a depth buffer for a frame being rendered is or can be prepared (e.g. in a depth (Z) pre-pass)).

The technology described herein is particularly suitable for use with tiled renderers (graphics processing systems). It is particularly suitable for tiled deferred renderers, but could also be used with other tiled methods, such as "tiled forward rendering", if desired. Thus, in an embodiment, the graphics processing system is a tiled renderer, in an embodiment a tiled deferred renderer.

It would also be possible to use the technology described herein in non-tiled renderers, e.g., and in an embodiment, by determining the light source visibility parameters for frame regions and storing them in visibility buffers, and then performing the final rendering (using the stored light source visibility parameters) in a separate rendering pass.

The graphics processing system is in an embodiment able to be operated both in a conventional graphics context, e.g. to perform conventional graphics rendering processes, and also in a compute context so as to be able to perform GPGPU processing.

The rasteriser of the graphics processing system will, as is known in the art, generate graphics fragments to be rendered to generate rendered graphics data for sampling points of the desired graphics output, such as a frame to be displayed. Each graphics fragment that is generated by the rasteriser has associated with it a set of sampling points of the graphics output and is to be used to generate rendered graphics data for one or more of the sampling points of the set of sampling points associated with the fragment.

The rasteriser may be configured to generate the fragments for rendering in any desired and suitable manner. It will, as is known in the art, receive e.g. primitives to be rasterised, test those primitives against sets of sampling point positions, and generate fragments representing the primitives accordingly.

The renderer should process the fragments generated by the rasteriser to generate rendered fragment data for (covered) sampling points that the fragments represent, as is known in the art. These rendering processes may include, for example, fragment shading, blending, texture-mapping, etc. In an embodiment the renderer is in the form of or includes a programmable fragment shader.

The graphics processing system may also contain any other suitable and desired processing stages that a graphics processing pipeline may contain such as an early depth (or an early depth and stencil) tester, a late depth (or depth and stencil) tester, a blender, a tile buffer or buffers, a write-out unit, etc.

The graphics processing system in an embodiment includes at least local memory, such as (on-chip) buffer or buffers, and/or register(s), that can be used to store the data required for the light source visibility parameter determination process and the determined light source visibility parameters. Where present, the tile buffers can be used for this purpose, if desired.

In some embodiments the graphics processing system is in communication with and/or includes one or more memory devices that store the data described herein and/or store software for performing the processes described herein. The graphics processing system may also be in communication with a display for displaying images based on the data described herein.

The technology described herein can be used for all forms of output that a graphics processing system may be used to generate, such as frames for display, render-to-texture outputs, etc.

In an embodiment, the various functions of the technology described herein are carried out on a single graphics processing platform that generates and outputs the rendered fragment data that is, e.g., written to the frame buffer for the display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Subject to any hardware necessary to carry out the specific functions discussed above, the graphics processing system can otherwise include any one or more or all of the usual functional units, etc., that graphics processing systems include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising computer program code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

Embodiments of the technology described herein will now be described in the context of the processing of computer graphics for display.

As is known in the art, and as discussed above, when a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output for display.

FIG. 1 shows schematically a graphics processing pipeline 1 that may operate in accordance with the technology described herein. The graphics processing pipeline 1 is a tiled deferred renderer with a fully programmable GPGPU context, for example a renderer which executes partly via Direct Compute, OpenCL, CUDA, etc.

As the graphics processing pipeline 1 shown in FIG. 1 is a tile-based renderer, it will thus, as is known in the art, produce tiles of a render output data array, such as an output frame to be generated.

(As is known in the art, in tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential. Each tile corresponds to a respective set of screen space sampling positions.)

Figure 2:
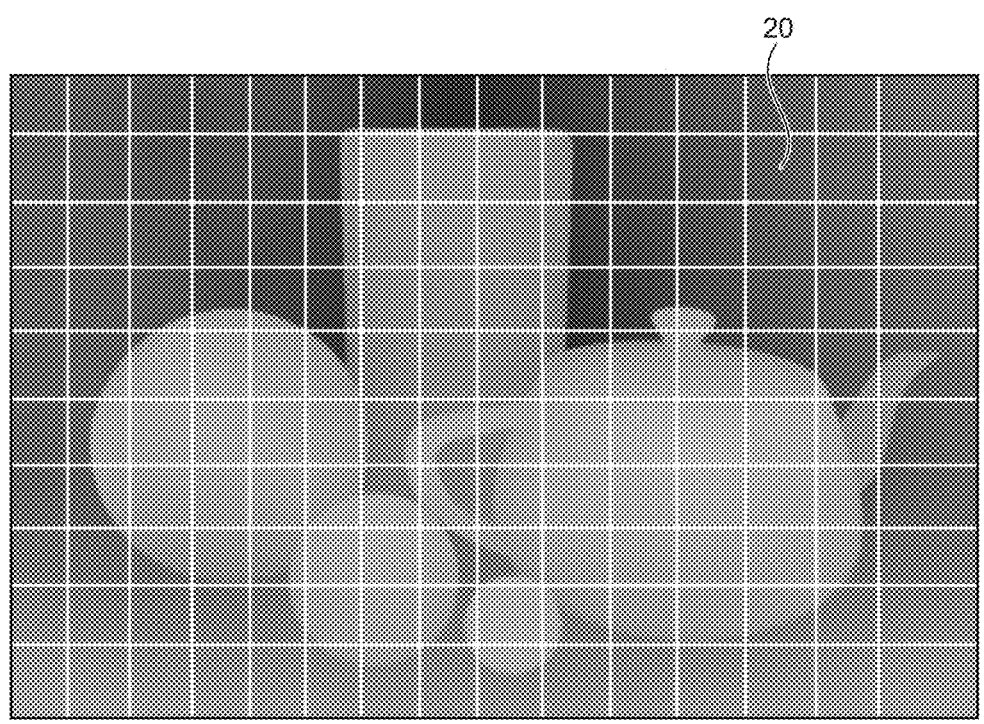
FIG. 2 shows an exemplary image to be displayed that has been divided into tiles for processing purposes.

FIG. 2 shows an exemplary image to be displayed that has been divided into respective tiles 20.

The render output data array may, as is known in the art, typically be an output frame intended for display on a display device, such as a screen or printer, but may also, for example, comprise intermediate data intended for use in later rendering passes (also known as a "render to texture" output), etc.

FIG. 1 shows the main elements and pipeline stages of the graphics processing pipeline 1 that are relevant to the operation of the present embodiment. As will be appreciated by those skilled in the art there may be other elements of the graphics processing pipeline that are not illustrated in FIG. 1. It should also be noted here that FIG. 1 is only schematic, and that, for example, in practice the shown functional units and pipeline stages may share significant hardware circuits, even though they are shown schematically as separate stages in FIG. 1. It will also be appreciated that each of the stages, elements and units, etc., of the graphics processing pipeline as shown in FIG. 1 may be implemented as desired and will accordingly comprise, e.g., appropriate circuitry and/or processing logic, etc., for performing the necessary operation and functions.

FIG. 1 shows schematically the pipeline stages after the graphics primitives (polygons) 2 for input to the rasterisation process have been generated. Thus, at this point the graphics data (the vertex data) has undergone fragment frontend operations 8, such as transformation and lighting operations (not shown), and a primitive set-up stage (not shown) to set-up the primitives to be rendered, in response to the commands and vertex data provided to the graphics processor, as is known in the art.

As shown in FIG. 1, this part of the graphics processing pipeline 1 includes a number of stages, including a rasterisation stage 3, an early Z (depth) and stencil test stage 4, a renderer in the form of a fragment shading stage 6, a late Z (depth) and stencil test stage 7, a blending stage 9, a tile buffer 10 and a downsampling and writeout (multisample resolve) stage 13.

The rasterisation stage 3 of the graphics processing pipeline 1 operates, as is known in the art, to rasterise the primitives making up the render output (e.g. the image to be displayed) into individual graphics fragments for processing. To do this, the rasteriser 3 receives graphics primitives 2 for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 4 performs, is known in the art, a Z (depth) test on fragments it receives from the rasteriser 3, to see if any fragments can be discarded (culled) at this stage. To do this, it compares the depth values of (associated with) fragments issuing from the rasteriser 3 with the depth values of fragments that have already been rendered (these depth values are stored in a depth (Z) buffer that is part of the tile buffer 10) to determine whether the new fragments will be occluded by fragments that have already been rendered (or not). At the same time, an early stencil test is carried out.

Fragments that pass the fragment early Z and stencil test stage 4 are then sent to the fragment shading stage 6. The fragment shading stage 6 performs the appropriate fragment processing operations on the fragments that pass the early Z and stencil tests, so as to process the fragments to generate the appropriate rendered fragment data, as is known in the art.

This fragment processing may include any suitable and desired fragment shading processes, such as executing fragment shader programs on the fragments, applying textures to the fragments, applying fogging or other operations to the fragments, etc., to generate the appropriate fragment data, as is known in the art. In the present embodiment, the fragment shading stage 6 is in the form of a shader pipeline (a programmable fragment shader), but other arrangements, such as the use also or instead of fixed function fragment shading units would be possible, if desired.

There is then a "late" fragment Z and stencil test stage 7, which carries out, inter alia, an end of pipeline depth test on the shaded fragments to determine whether a rendered fragment will actually be seen in the final image. This depth test uses the Z-buffer value for the fragment's position stored in the Z-buffer in the tile buffers 10 to determine whether the fragment data for the new fragments should replace the fragment data of the fragments that have already been rendered, by, as is known in the art, comparing the depth values of (associated with) fragments issuing from the fragment shading stage 6 with the depth values of fragments that have already been rendered (as stored in the depth buffer). This late fragment depth and stencil test stage 7 also carries out any necessary "late" alpha and/or stencil tests on the fragments.

The fragments that pass the late fragment test stage 7 are then subjected to, if required, any necessary blending operations with fragments already stored in the tile buffer 10 in the blender 9. Any other remaining operations necessary on the fragments, such as dither, etc. (not shown) are also carried out at this stage.

Finally, the (blended) output fragment data (values) are written to the tile buffer 10 from where they can, for example, be output to a frame buffer for display. The depth value for an output fragment is also written appropriately to a Z-buffer within the tile buffer 10. (The tile buffer will store, as is known in the art, colour and depth buffers that store appropriate colour, etc., values or a Z-value, respectively, for each sampling position that the buffers represent (in essence for each sampling position of a tile that is being processed).) These buffers store, as is known in the art, an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

In the present embodiment, the tile buffer stores its fragment data as 32×32 arrays (i.e. corresponding to a 32×32 array of sample positions in the output to be generated, e.g., in the image to be displayed). Each 32×32 data position array in the tile buffer can accordingly correspond to (and will "natively" support) a 16×16 pixel "tile" of, e.g., the frame to be displayed, at 4× anti-aliasing (i.e. when taking 4 samples per pixel).

The tile buffer is provided as part of RAM that is located on (local to) the graphics processing pipeline (chip).

The data from the tile buffer 10 is input to a downsampling (multisample resolve) write out unit 13, and thence output (written back) to an external memory output buffer, such as a frame buffer of a display device (not shown). (The display device could comprise, e.g., a display comprising an array of pixels, such as a computer monitor or a printer.)

In the present embodiments, the downsampling and writeout unit 13 downsamples (in either a fixed or variable fashion) the fragment data stored in the tile buffer 10 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 1 would, of course, be possible.

The above describes certain features of the operation of the graphics processing system shown in FIG. 1. Further features of the operation of the graphics processing system shown in FIG. 1 that allow the effect of shadows in an image being rendered to be simulated in accordance with embodiments of the technology described herein will now be described.

The present embodiments will be described, for ease of explanation, with reference to processing a frame composed of solid geometry and a single, rectangular, area light source. However, other arrangements would, of course, be possible.

The present embodiments operate to simulate the effect of shadows in an image being rendered by determining, for each tile of the output frame, a set of geometry that could cast a shadow from a light source on objects in the tile, and then using that determined set of "shadow-casting" geometry to derive a light source visibility parameter for each sampling position of the tile in question. The light source visibility parameters for the sampling positions for the tile are then used when rendering (shading) the output image for the tile to modulate the colour values for the sampling positions so as to simulate the effect of the shadows at the sampling positions.

Figure 3:
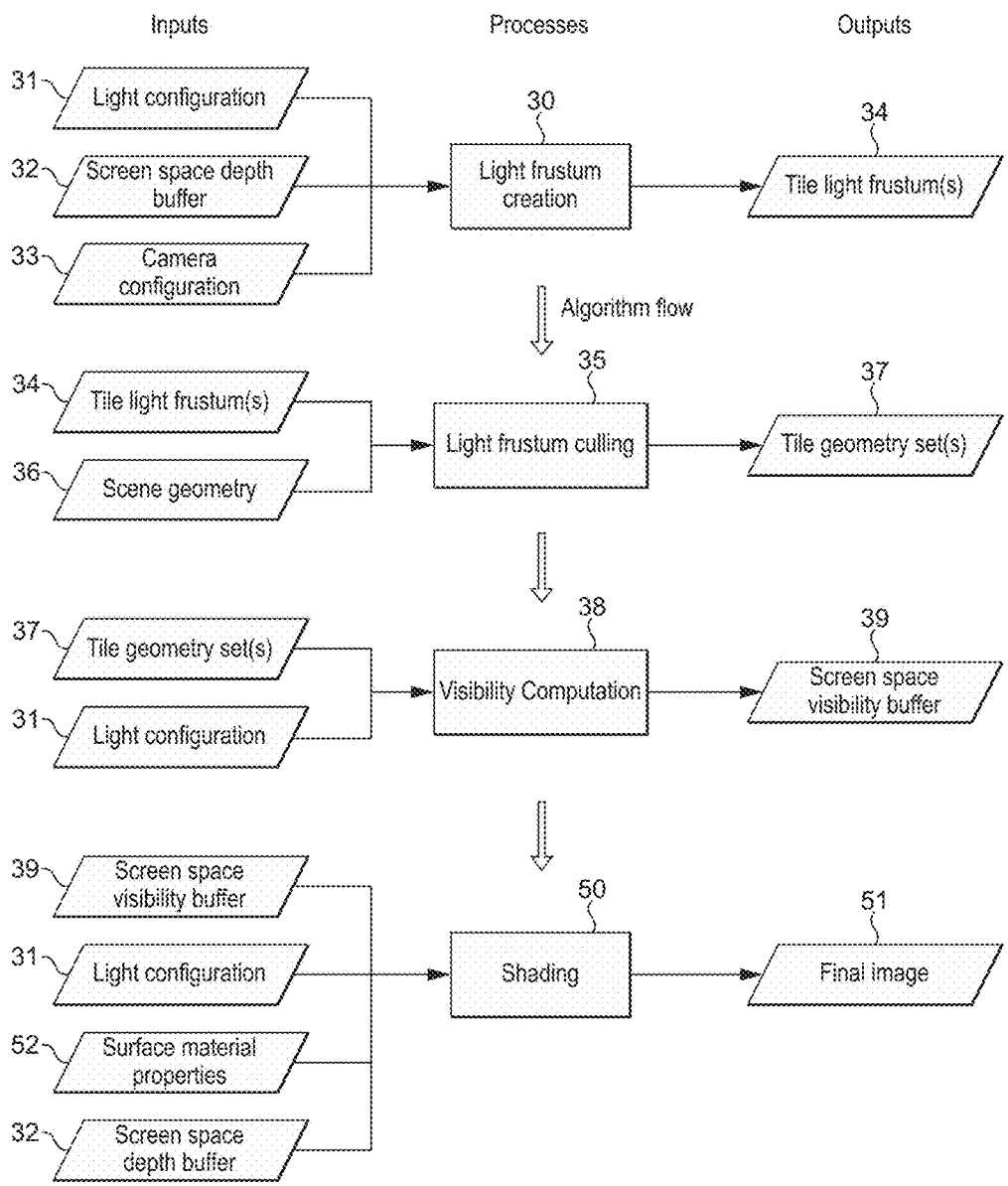
FIG. 3 shows schematically the processing of a tile being rendered in an embodiment of the technology described herein.

FIG. 3 shows schematically this operation for a given tile in more detail.

As shown in FIG. 3, the process starts by creating bounding frustums for the light or for each light that could shine in the tile in question (step 30). This operation takes as its inputs information about the configuration of the light or lights for the frame being rendered, a screen space depth buffer 32 that has previously been derived from the geometry for the frame, and information indicating the camera configuration 33 for the frame, and produces as its output, one or more light source bounding frustums 34 for the tile.

In the present embodiment, one bounding frustum is produced for a tile for each light source, although other arrangements, such as producing plural bounding frustums for a given light source, would be possible, if desired. It may, for example, be desirable to produce plural bounding frustums for a given light source if, for example, there are large depth discontinuities in the frame, and/or when the screen space samples for the frame can be split into disjoint groups which are themselves local, but far apart from each other.

Figure 4:
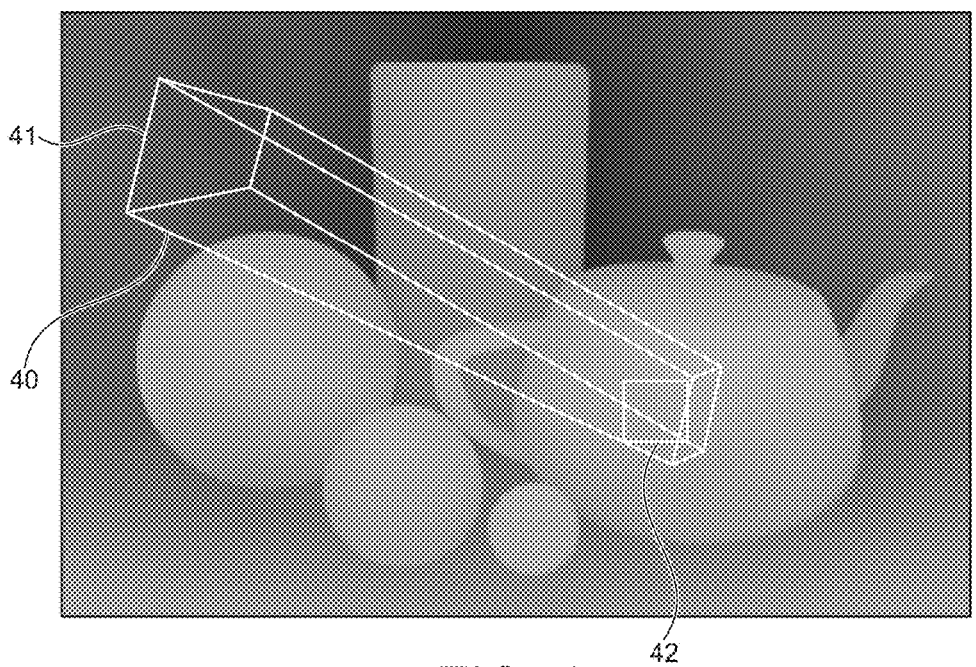
FIG. 4 shows an exemplary light source bounding frustum for a tile.

To determine a light source bounding frustum for a tile, the minimum and maximum depth values for the tile are determined from using the data in the screen space depth buffer 32. This is then used to construct a bounding frustum which contains all of the visible geometry in the tile and the light source itself. FIG. 4 illustrates this and shows an exemplary light source bounding frustum 40 for an area light 41 for a given tile 42 of the frame.

Once all the light source bounding frustums have been derived for the tile being processed, those light source bounding frustums are then used, as shown in FIG. 3, to determine a set of geometry for the tile that could cast a shadow in the tile (step 35).

To do this, as shown in FIG. 3, the scene (frame) geometry 36 is culled against the light source bounding frustum(s) 34 for the tile in a light frustum culling process 35. This process operates to construct a list of possible occluding geometry (e.g. triangles in the case where the frame geometry is in the form of triangles) which could affect the shading of the tile (cast a shadow in the tile), by determining, for each geometry object (e.g. triangle), whether or not it intersects a light source bounding frustum for the tile. (This is on the basis that any occluding geometry which could affect the shaded value of geometry in the tile must intersect the light source bounding frustum for the tile.)

The output of this process is accordingly a list 37 of geometry (e.g. triangles) for the tile which could cast a shadow in the tile.

The light source bounding frustum culling operation 35 can be carried out as desired. For example, it would be possible to iteratively test each geometry object (e.g. triangle) in turn against each light source bounding frustum. However, in the present embodiments, this operation is accelerated by using a hierarchy for the tile light source bounding frustums and a separate hierarchy for the geometry. In this case, high level, bounding volume, representations of the geometry are first tested against light source bounding frustums for sets of plural tiles, and then any high level bounding volume representations of geometry that pass this first stage are intersection tested against the individual tile light source bounding frustums. Finally, individual geometry objects (e.g. triangles) are tested against the individual tile light source bounding frustums.

Once the lists (sets) of geometry 37 that could affect the shading of the tile have been determined, those sets of geometry are then used to determine a light source visibility parameter for each sampling position in the tile in question in a visibility computation process 38, as shown in FIG. 3. This visibility computation operation 38 operates to determine a light source visibility parameter for each sampling position of the tile (which light source visibility parameter is then used to modulate the light source to simulate the effect of the shadows at the sampling position in question).

To do this, an array of sampling positions (representing the location of the light source being considered) is determined, and it is then determined for each tile screen space sampling position, whether rays cast between the tile sampling position and each light source sampling position would intersect occluding geometry or not.

Figure 5:
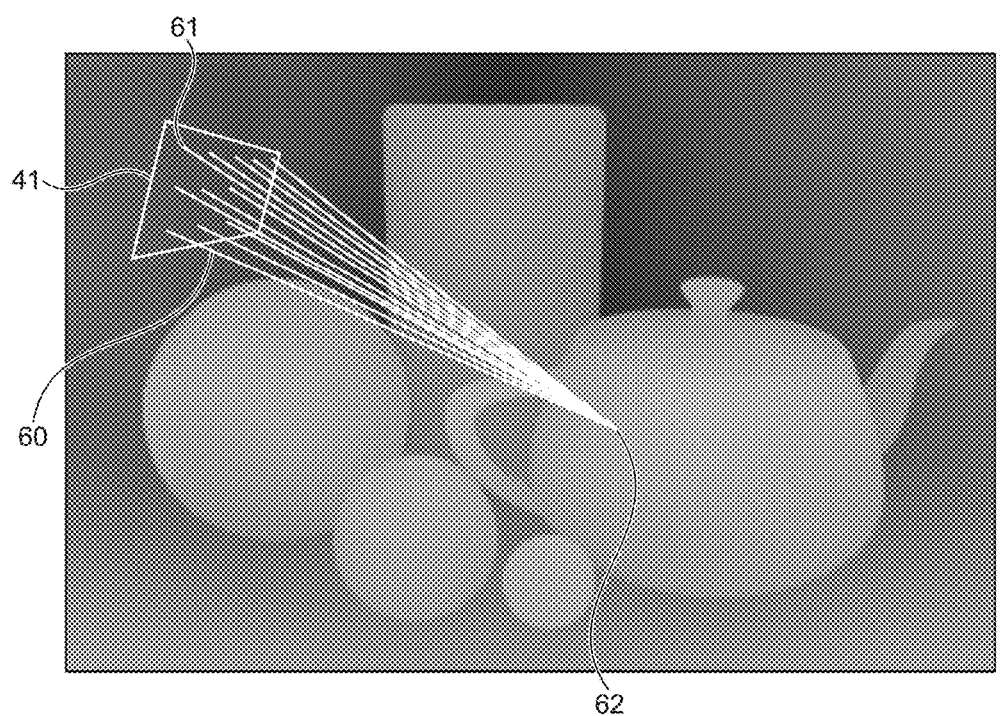
FIGS. 5, 6, and 7 illustrate the determination of occluded light source sampling positions in an embodiment of the technology described herein.
Figure 6:
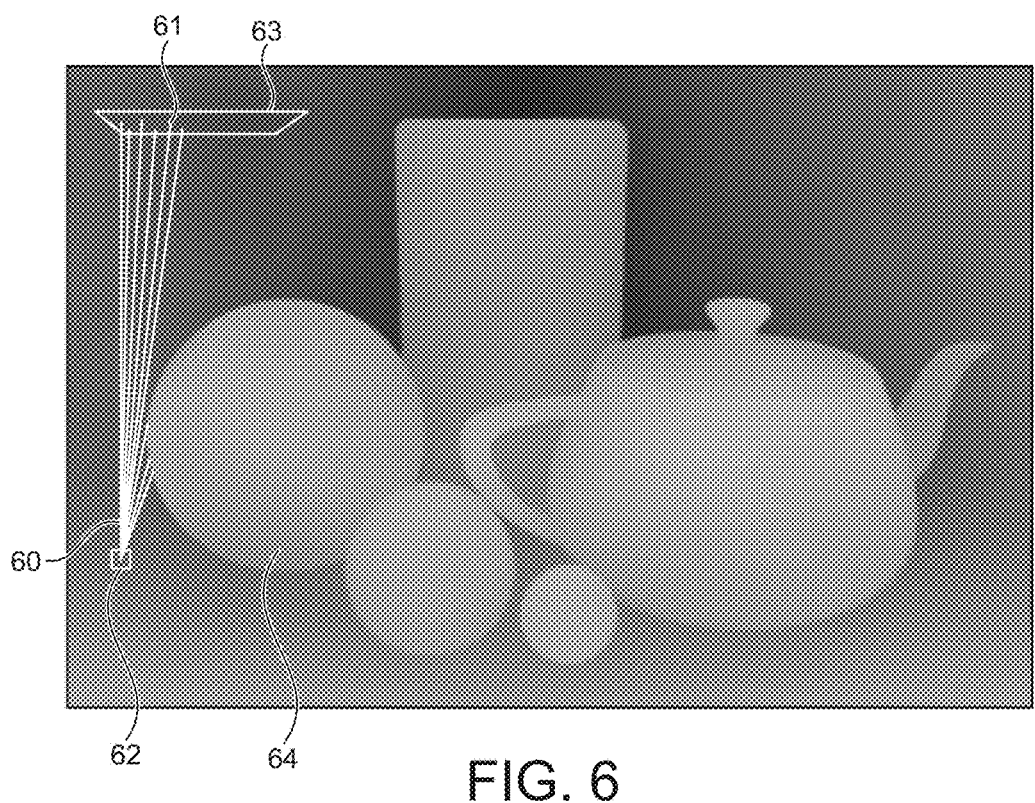
Figure 7:
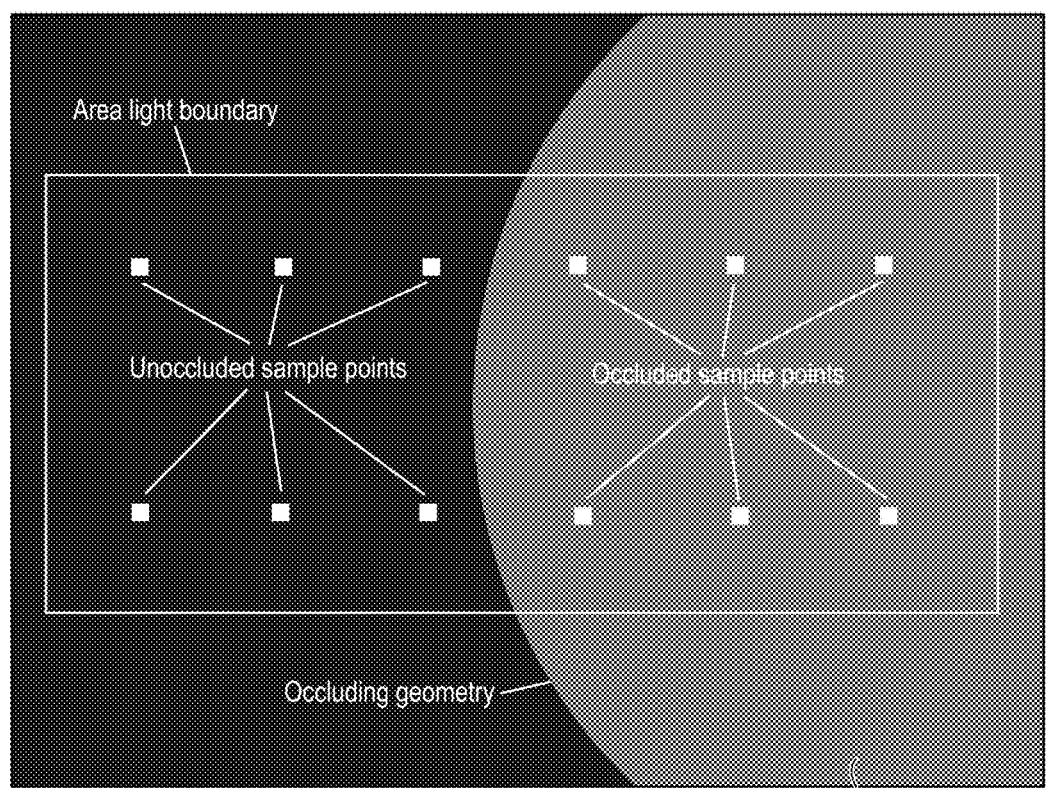

FIGS. 5, 6 and 7 illustrate this operation. FIG. 5 shows exemplary rays 60 cast from sampling positions 61 for an area light 41 to a tile sampling position 62. In this example shown in FIG. 5, it is assumed that none of the rays from the tile sampling position 62 to the light source sampling position 61 intersect occluding geometry.

FIG. 6 shows an alternative situation in which some of the rays 60 cast from the tile sampling position 62 being considered to sampling positions 61 representing an area light 63 will be intersected by occluding geometry 64.

As shown in FIG. 7, in this case, some of the sampling points representing the area light 63 will be occluded from the perspective of the tile sampling position 62 by the occluding geometry 64 and others of those sampling points will not be occluded.

In the present embodiments, the determination of whether rays cast between a tile sampling position and each light source sampling position would intersect occluded geometry is carried out as a rasterisation operation. To do this, a single execution thread is used for each tile sampling position, and operates to rasterise the geometry (e.g. triangles) as indicated by the determined sets of geometry 37 for the tile onto a render target that corresponds to the array of sampling positions that represent the light source. As for each sampling position in the tile the same set of geometry (e.g. triangles) will be considered, the memory access and thread execution pattern for this operation can be extremely coherent.

In the present embodiment, this rasterisation operation (the visibility computation process 38) operates to identify for each light source sampling position whether it is occluded from the tile sampling position in question by any geometry or not. Thus the render target for the rasterisation process is an array having a single bit for each light source sampling position, with the bit being set by the rasterisation operation if it is determined that the light source sampling position in question will be visible from the tile sampling position being considered.

In this arrangement, where, for example, the light source is represented by, e.g., a few hundred sampling positions, the "light source visibility" render target will only require a few hundreds of bits (one per sampling position), and so can, for example, fit in registers (i.e. does not need to be stored in main memory).

Once all the geometry (e.g. triangles) have been considered by the rasterisation process, the number of set bits in the rendered target is then counted (i.e. the number of visible light source sampling positions for the tile sampling position in question is counted), and used to determine a light source visibility parameter value for the tile (screen space) sampling position in question. In the present embodiment, the light source visibility parameter value for the tile (screen space) sampling position is determined as the ratio of visible (non-occluded) light source sampling positions for the tile sampling position in question to the total number of light source sampling positions for the light source in question. Other arrangements would of course be possible.

This value is then stored for the tile sampling position in question in a screen space visibility buffer 39 that will store the determined light source visibility parameters for each sampling position of the tile. The process is then repeated for the next sampling position in the tile, and so on, until a light source visibility parameter has been determined and stored in the screen space visibility buffer 39 for each sampling position of the tile.

The screen space visibility buffer 39 for the tile is stored locally to the graphics processing pipeline, e.g. in registers (and does not need to be and is not written out to main memory).

In these arrangements, the light source visibility parameter for a tile sampling position could simply be the proportion (ratio) of the number of light source sampling positions that are visible at the sampling position in question, or, for example, the proportion of visible light source sampling positions could be scaled to a number that is within a predefined range, such as between 0 and 1, which scaled value is then used as the light source visibility parameter value for the tile sampling position in question.

The array of sampling positions that represent the location of the light source being considered in these embodiments can be selected as desired. FIG. 8 illustrates exemplary sampling position arrays that can be used for this process. In FIG. 8, the darker points are the actual sampling positions; the remaining points are to help illustrate the layout of the sampling positions.

Figure 8A:
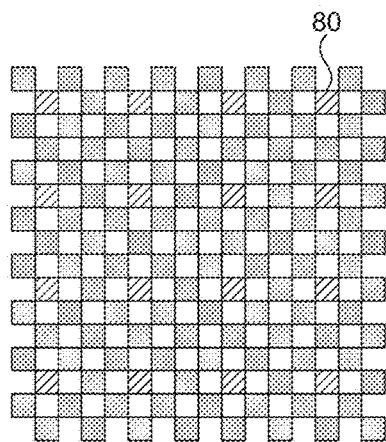
FIGS. 8A, 8B, 8C and 8D show exemplary arrays of light source sampling positions that can be used in the embodiments of the technology described herein.

The sampling positions in the array of sampling positions representing the light source are in an embodiment regularly spaced from each other, e.g. in a regular grid. FIG. 8A illustrates such an arrangement and shows a regular grid of sampling positions 80. Using regularly spaced sampling positions means that during the rasterisation process to identify occluded light source sampling positions, the occlusion for each array of sampling positions can be computed together in scanline fashion, and then written to the render target with appropriate bit shift and logical OR operation. This is more efficient for then considering each sampling position separately.

The Applicants have recognised that the regularity of the sample pattern used in FIG. 8A could cause aliasing (and thus loss of quality), particularly in the potentially common case of rectangular area lights and occluding geometry which are both aligned to coordinate axes.

Figure 8B:
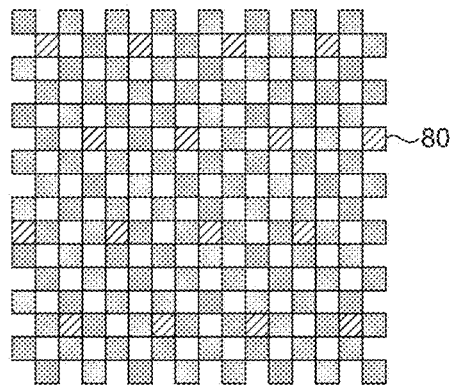

In another embodiment therefore, a sampling arrangement in which a varying offset is added to each row of sampling positions is used. FIG. 8B shows such a sampling position arrangement. This will improve aliasing in one direction (but not the other).

Figure 8C:
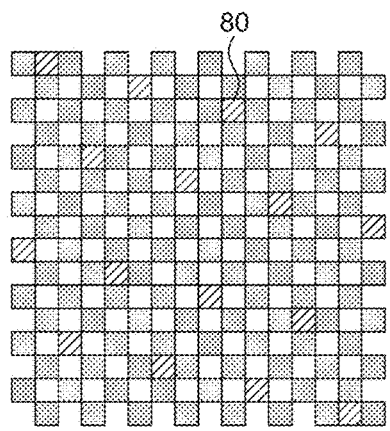

In another embodiment, the light source sampling position array is arranged such that the rows of sampling positions do not align with the light source. (There is no need for the sampling position rows to align with the light source, because the resulting "visibility" render target won't be written or read as a screen space buffer). FIG. 8C shows such an arrangement. This arrangement will prevent aliasing in the aligned directions, but there may still be aliasing parallel to the new row direction.

Figure 8D:
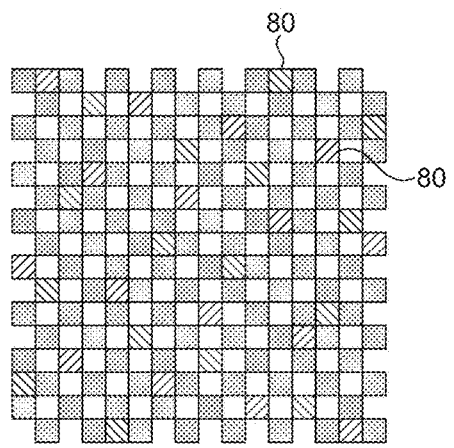

FIG. 8D accordingly shows a further improved light source sampling position array that should further reduce the risk of aliasing. In this arrangement, a similar pattern to that shown in FIG. 8C, but rotated, has been superimposed, so that there are now both rows and columns of sampling positions having varying offsets.

A suitable "lightweight" light source sampling position array for "real-time" use would be to use 128 samples, arranged in eight rows and eight columns of 8 sampling points each. Other arrangements would, of course, be possible.

Once the screen space visibility buffer 39 for a tile has been determined, the values in the screen space visibility buffer can then be used when shading the geometry in the tile to produce the rendered output image for the tile, as shown in FIG. 3 (step 50).

As shown in FIG. 3, the shading operation 50 will, as is known in the art, determine an output set of colour data for each tile sampling position that is then used to display the output image 51. This shading operation will, inter alia, take into account the intensity and colour of the light source, the colour and transparency of the surface that the light is falling on the depth of the surface that the light is falling on, and, in accordance with the present embodiments, the determined light source visibility parameters, to determine the output colour for each tile sampling position.

To do this, the shading operation 50 uses, inter alia, the light configuration 31 for the frame, the relevant surface material properties 52 at the sampling position in question, the depth 32 at the sampling position in question, and the light source visibility parameter in the screen space visibility buffer 39 for the tile sampling position being considered. The light source visibility parameter from the screen space visibility buffer 39 is used in the shading operation 50 in the present embodiments to modulate (attenuate) the indicated illumination value for the light source in question at the (and at each) tile sampling position being considered, by multiplying the illumination value for the light source by the light source visibility parameter for the tile sampling position being considered. This will then give a good, visually pleasing approximation to the correct shadowing result. Other arrangements would, of course, be possible.

As discussed above, the screen space visibility buffer 39 for the tile is stored locally to the graphics processing pipeline, e.g. in registers, and thus it will be consumed locally by the shading operation 50.

In the present embodiments, each of the processing stages shown in FIG. 3 (thus the light frustum creation 30, the light frustum culling 35, the visibility computation 38 and the shading 50) are performed by the graphics processing system performing GPGPU processing via a compute context.

The above describes the operation for a single output tile for a single light source. The operation can be extended in a corresponding manner to arbitrarily many light sources for a tile. In this case, the cost of the initial geometry phase (the cost of the determination of the lists of (potentially) shadow-casting geometry) could, for example, be amortised by considering all the light sources at once, if desired.

It will also be appreciated that this operation should be repeated for each tile of the frame being rendered for output (at least where there could be shadow-casting geometry).

Figure 9:
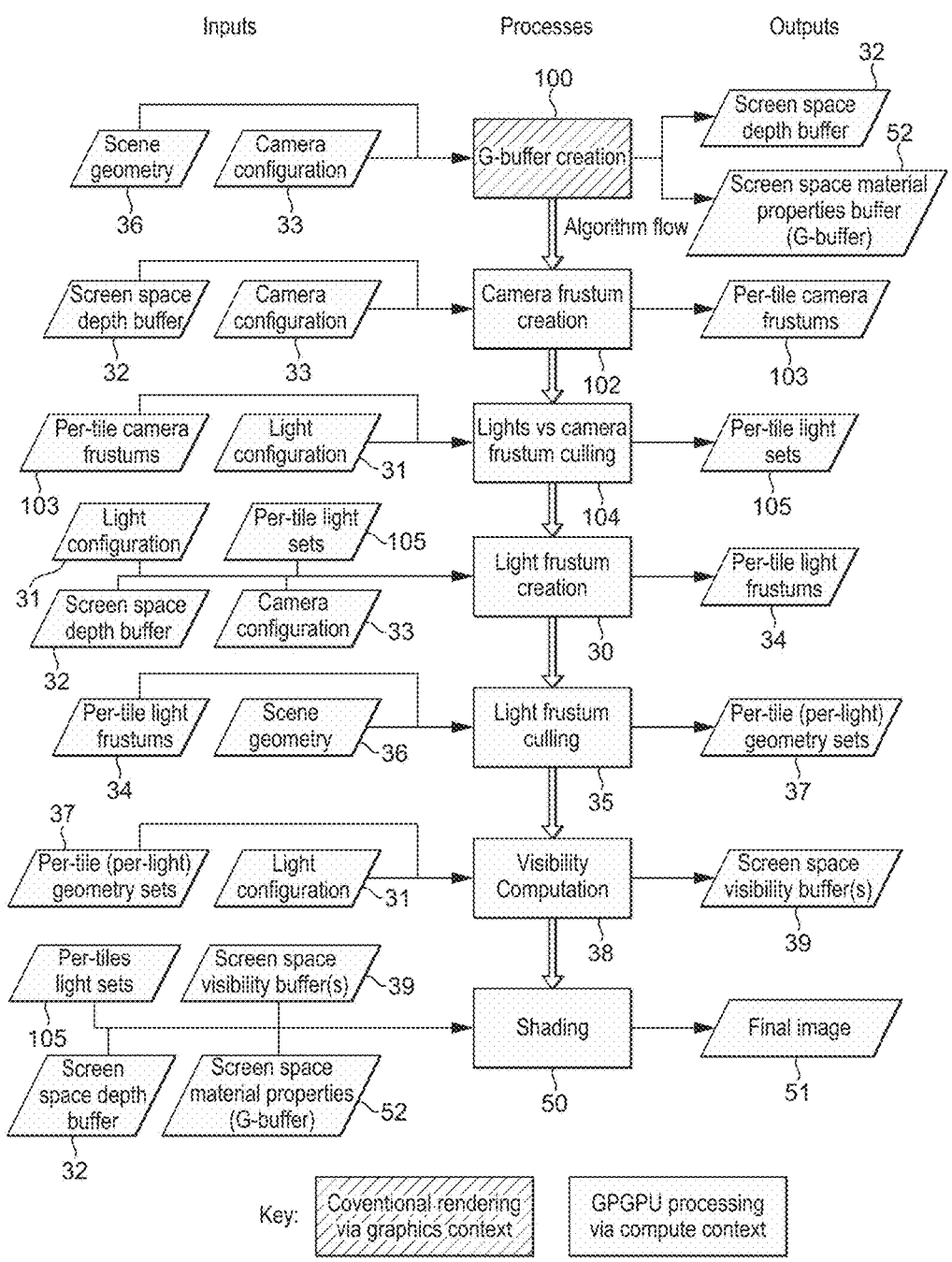
FIG. 9 shows schematically the processing of a frame being rendered in an embodiment of the technology described herein.

FIG. 9 illustrates the operation of an embodiment of the technology described herein when processing all the tiles of a frame to be output in the manner of the above embodiment.

As shown in FIG. 9, the process starts (step 100) with the creation of graphics G buffers that will store and represent the screen space material properties for use for the frame, and the generation of the screen space depth buffer 32 for each tile of the frame. As shown in FIG. 9, this process takes as its inputs the scene geometry 36 and camera configuration 33 for the frame, and produces as its outputs a screen space depth buffer 32 and screen space properties buffer (G buffer) 52. This operation is performed as a conventional rendering operation, with the graphics processing system operating in a graphics context.

A set of per-tile camera frustums are then created in a camera frustum creation operation 102. This takes as its inputs the screen space depth buffer 32 and the camera configuration 33, and produces as its output a set of per-tile camera frustums 103.

The per-tile camera frustums 103 are then used with the light configuration 31 for the frame in a "lights vs. camera frustum" culling operation 104 that determines which lights affect which tiles, and produces as its output per-tile light sets 105. This operation effectively determines for each tile whether any geometry in the tile can be affected by a light source for the frame. (Tiles which are outside the volumes of influence of all of the light sources, or all of whose geometry faces away from the light sources, can be ignored and omitted from the remainder of the light source processing operation.)

Then, as shown in FIG. 9, for each tile which could be lit by a light source, appropriate light source bounding frustums are created (as discussed above in relation to FIG. 3) (step 30).

The so-determined per-tile light frustums are then used in a light frustum culling step 35 to determine the per-tile (per-light) sets of shadow-casting geometry 37 (again as discussed above in relation to FIG. 3).

Then, for each tile, a light source visibility parameter computation 38 is performed, to provide a screen space visibility buffer 39 for each tile for each light source that affects the tile in question. (A separate screen space visibility buffer is generated for each light source that could affect the tile.)

Finally, the determined screen space visibility buffers 39 are used in the shading operation 50 to produce the final rendered output version of each tile that is being considered, as described above in relation to FIG. 3. (Any tiles that are not affected by the light sources will be shaded at this stage in the normal manner for the graphics processing system in question.)

In this embodiment, the camera frustum creation operation 102, the lights vs. camera frustum culling operation 104, the light frustum creation operation 30, the light frustum culling operation 35, the visibility computation operation 38, and the shading operation 50 are again performed using GPGPU processing with the graphics processing system operating in a compute context.

The process can then be repeated for the next frame, and so on.

Various modifications, additions, and alternatives to the above-described embodiments of the technology described herein would be possible, if desired.

For example, although the above embodiments use and FIG. 8 illustrates a rectangular area light, other planar light shapes could be supported, for example by using a bounding rectangle and a mask shape, or more specialised sample point placement schemes, to match the shape of the light source. It would also be possible to use a three-dimensional sampling position array to deal with light shapes that have volume.

It would also be possible to skip work where it can be determined that all the relevant sampling positions are occluded. For example, a whole screen space tile could be deemed to be occluded with no further work if a single triangle occludes its entire frustum.

Also, the above embodiments consider the geometry in world-space (perform the frustum tests in world space). Depending upon the graphics processing hardware that is available and the results that are required, it would also be possible to perform the computations in screen space, if desired.

Rather than the light source visibility parameter for a tile sampling position simply being based on the "count" of visible light source sampling positions at the tile sampling position in question, a more sophisticated measure of the effect of the light at the tile sampling positions could be determined, if desired. For example, the distance from the light source and/or a factor representing the illumination from the part of the light source in question could be used to determine a measure of the amount of light that will fall on the tile sampling position from each non-occluded light source sampling position.

It would also be possible to take account of transparency (a values) associated with the geometry objects being considered. For example, where "punch through" alpha (transparency) is being used, an alpha look-up to determine if the geometry in question will be opaque or transparent at the position in question in the output frame could be included in the light source sampling position visibility test.

It would also be possible, e.g., to use a transparency (a) value associated with an occluding object to modulate the determined amount of light falling on the tile sampling position in question.

Transparent surfaces could be taken account of by generating a minimum geometry depth value and a maximum geometry depth value for each tile sampling position, rather than a single depth value, and then used to generate light source bounding frustums based on the respective minimum and maximum depth values that could then be tested to determine two sets of light source visibility parameters, one for the opaque geometry and one for the translucent geometry.

It would also be possible to determine depths of multiple layers of translucent geometry, if desired, and to accordingly determine plural light source bounding frustums for identifying whether, and which, respective layers of translucent geometry occlude the light source at a given tile sampling position.

The multiple "layer" light source visibility parameters could be used to determine how the light passes through the layers of translucent geometry, and, e.g., how much light passes into an object.

Also, although in the above embodiments the screen space visibility buffers are stored locally to the graphics processing pipeline, e.g. in registers, it would be possible to write those buffers out to main memory, if desired. In this case, the screen space visibility buffers could be written out at a lower resolution than the desired final output, and then, for example, upsampled using a method which preserves contrast at image edges (e.g. a bilateral filter) when the screen space visibility parameter values are to be used.

It would also be possible to integrate (combine) the light source visibility parameter determination with the final shading operation that uses that parameter, thereby removing the need to store screen space visibility buffers at all. (In this case there will be a single processing operation for a tile sampling position that will, e.g., determine the light source visibility parameter for the sampling position and then shade the sampling position using that light source visibility parameter.

Also, although the above embodiment has been described in the context of a tiled deferred renderer, this is not essential, and the present embodiments (and the technology described herein) can be used with and for other forms of renderer. In general, so long as a pre-prepared depth buffer for a frame is available (or can be generated), the technology described herein can then be used. Thus, for example, the present embodiments and the technology described herein could be used with other tiled methods, such as "tiled forward rendering" (also known as "forward plus"), and also with non-tiled renderers (where a depth buffer for the frame can be generated). With a non-tiled renderer, a tiled approach could be used to render the light source visibility parameters into respective screen space visibility buffers, with the final rendering (shading) then being performed in a separate pass.

Also, although the present embodiments have been described with reference to the use of the present embodiments for an area light, it would also be possible to use the techniques of the present embodiments for point ("punctual") lights, if desired. In this case, for example, a single light source sampling position for the point light could be used. As in this case it may be less efficient to rasterise onto a 1×1 render target per tile sampling position when determining the light source visibility parameters, for "point" lights, the rasterisation could instead be done as if from the viewpoint of the light (such that the output then would be a render target representing each tile sampling position, and indicating whether the point light source is visible from that tile sampling position or not). This output could then again be used to derive appropriate light source visibility parameters (e.g. a screen space visibility buffer) for the sampling positions of the tile, e.g. based on whether it indicates that the point light source is visible from the tile sampling position or not.

It would also be possible to use the techniques of the technology described herein to determine the effect of shadows cast by moving objects (i.e. to account for "motion blur").

For example, multiple sets of light source visibility parameters for a frame region (and for the light source in question) could be determined, for each of plural respective different instances in time (e.g. over the time period between frames), with the positions of the geometry in the frame being varied depending upon which instance in time the light source visibility parameter determination is being performed for and the motion of the object(s) in question, with the determined respective light source visibility parameters for each instance in time (geometry position) then being combined (e.g. averaged) to provide a light source visibility parameter for each tile sampling position that will accordingly take better account of the motion of the geometry during the time interval of the frame.

It can be seen from the above that the technology described herein, in its embodiments at least, provides a method and system that can provide good, visually pleasing approximations to the correct shading result where shadows are being cast, but in a significantly more memory and bandwidth efficient manner. In particular, the method and system of the technology described herein allows the "shadow" visibility data to be produced and consumed "locally" (e.g. in registers), such that there is no need for main memory bandwidth proportional to the "quality" of the shadows (but rather only proportional to the original geometry). This is in contrast to existing shadow volume and shadow map methods, which would require many megabytes of memory and bandwidth to provide equivalent quality shadowing.

This also means that the method and system of the technology described herein is particularly suited to rendering shadows for "difficult" and more complex cases, such as high image resolution, area lights and "motion blur". The technology described herein can also more accurately take account of the effect of transparency.

This is achieved, in the embodiments of the technology described herein at least, by determining a light source visibility parameter for sampling positions of a frame region being rendered, which light source visibility parameter is then used to modulate the effect of the light source in question when performing the shading process for the frame region.

The foregoing detailed description of the technology described herein has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein, and its practical application, to thereby enable others skilled in the art to best utilise the technology described herein in various embodiments and with various modifications as are suited to the particular use contemplated. It is intended that the scope of the technology described herein be defined by the claims appended hereto.

The invention claimed is:

1. A method of operating a graphics processing system when rendering a frame for output that includes a light source, the method comprising:

for at least one region of the frame being rendered:
determining by processing circuitry a set of the geometry to be processed for the frame that could cast a shadow in the frame region being rendered from a light source to be considered for the frame, wherein the set of geometry that could cast a shadow comprises one or more geometry objects that do not form part of the light source; and
for each sampling position of a set of sampling positions for the region of the frame being rendered, determining by processing circuitry a light source visibility parameter using the determined set of geometry for the frame region that could cast a shadow from the light source;
wherein the step of determining the set of geometry for the frame region that could cast a shadow from the light source comprises:
determining one or more light source bounding frustums that contain geometry that is visible in the frame region and the light source being considered;
determining for geometry objects for the frame that do not form part of the light source, whether or not they intersect at least one of the light source bounding frustums for the frame region; and
when it is determined that a geometry object for the frame that does not form part of the light source intersects at least one of the light source bounding frustums for the frame region, including that geometry object in the set of geometry for the frame region that could cast a shadow from the light source.

2. The method of claim 1, wherein the graphics processing system is a tile-based system, and the region of the frame being rendered is a tile.

3. The method of claim 1, wherein the step of determining a light source visibility parameter using the determined set of geometry for each sampling position of a set of sampling positions for the region of the frame being rendered comprises:
 determining a light source visibility parameter for each screen space sampling position of the region of the frame being rendered.

4. The method of claim 1, wherein the frame being rendered is divided into plural regions, and the method comprises:
 determining by processing circuitry which of the regions that the frame has been divided into could be lit by the light source being considered; and
 for each region of the frame being rendered that is determined could be lit by the light source:
 determining by the processing circuitry a set of the geometry to be processed for the frame that could cast a shadow from the light source in the region of the frame; and
 for each sampling position of a set of sampling positions for the region of the frame, determining by the processing circuitry a light source visibility parameter using the determined set of geometry.

5. The method of claim 1, wherein the step of determining a light source visibility parameter for a frame region sampling position comprises:
 determining, for each of one or more sampling positions representing the position of the light source, whether the light source sampling position will be visible from the frame region sampling position using the determined set of geometry that could cast a shadow for the frame region.

6. The method of claim 5, wherein the step of determining whether the light source sampling positions will be visible from a frame region sampling position is done using a rasterisation operation.

7. The method of claim 5, wherein the light source visibility parameter for a frame region sampling position is based on the number of light source sampling positions determined to be visible at the frame region sampling position.

8. The method of claim 5, wherein the light source visibility parameter for a frame region sampling position is based on a measure of the amount of light that will fall on the frame region sampling position from each visible light source sampling position.

9. The method of claim 1, wherein the step of determining a light source visibility parameter for a frame region sampling position takes account of any transparency values associated with the geometry in the determined set of geometry that could cast a shadow for the frame region.

10. The method of claim 1, further comprising:
 using by processing circuitry the determined light source visibility parameters for the region of the frame being rendered to modulate the effect of the light source in question at each sampling position of the output version of the frame region when rendering an output version of the frame region.

11. The method of claim 1, further comprising:
 using by processing circuitry the determined light source visibility parameters for the region of the frame being rendered when rendering an output version of the frame region without the determined light source visibility parameters being written out to main memory.

12. The method of claim 1, further comprising:
 determining by processing circuitry light source visibility parameters for a frame region for a light source for plural different positions of the geometry in the frame, based on the motion of the geometry during the time interval for the frame.

13. A graphics processing system comprising:
 a rasteriser that rasterises input primitives to generate graphics fragments to be processed, each graphics fragment having one or more sampling points associated with it, and a renderer that processes fragments generated by the rasteriser to generate output fragment data;
 and wherein the graphics processing system is capable of, when rendering a frame for output that includes a light source:
 for at least one region of the frame being rendered:
 determining by processing circuitry a set of the geometry to be processed for the frame that could cast a shadow in the frame region being rendered from a light source to be considered for the frame, wherein the set of geometry that could cast a shadow comprises one or more geometry objects that do not form part of the light source; and
 for each sampling position of a set of sampling positions for the region of the frame being rendered, determining by processing circuitry a light source visibility parameter using the determined set of geometry for the frame region that could cast a shadow from the light source;
 wherein the step of determining the set of geometry for the frame region that could cast a shadow from the light source comprises:
 determining one or more light source bounding frustums that contain geometry that is visible in the frame region and the light source being considered;
 determining for geometry objects for the frame that do not form part of the light source, whether or not they intersect at least one of the light source bounding frustums for the frame region; and
 when it is determined that a geometry object for the frame that does not form part of the light source intersects at least one of the light source bounding frustums for the frame region, including that geometry object in the set of geometry for the frame region that could cast a shadow from the light source.

14. The system of claim 13, wherein the graphics processing system is a tile-based system, and the region of the frame being rendered is a tile.

15. The system of claim 13, wherein the graphics processing system is capable of determining by the processing circuitry a light source visibility parameter for each screen space sampling position of the region of the frame being rendered.

16. The system of claim 13, wherein the frame being rendered is divided into plural regions, and the graphics processing system is capable of:
 determining by processing circuitry which of the regions that the frame has been divided into could be lit by the light source being considered; and for each region of the frame being rendered that is determined could be lit by the light source:
    determining by the processing circuitry a set of the geometry to be processed for the frame that could cast a shadow from the light source in the region of the frame; and
    for each sampling position of a set of sampling positions for the region of the frame, determining by the processing circuitry a light source visibility parameter using the determined set of geometry.

17. The system of claim 13, wherein determining a light source visibility parameter for a frame region sampling position comprises:
    determining, for each of one or more sampling positions representing the position of the light source, whether the light source sampling position will be visible from the frame region sampling position using the determined set of geometry that could cast a shadow for the frame region.

18. The system of claim 17, wherein determining whether the light source sampling positions will be visible from a frame region sampling position is done using a rasterisation operation.

19. The system of claim 17, wherein the light source visibility parameter for a frame region sampling position is based on the number of light source sampling positions determined to be visible at the frame region sampling position.

20. The system of claim 17, wherein the light source visibility parameter for a frame region sampling position is based on a measure of the amount of light that will fall on the frame region sampling position from each visible light source sampling position.

21. The system of claim 13, wherein the graphics processing system is capable of, when determining a light source visibility parameter for a frame region sampling position, taking by the processing circuitry account of any transparency values associated with the geometry in the determined set of geometry that could cast a shadow for the frame region.

22. The system of claim 13, wherein the graphics processing system is further capable of:
    using by processing circuitry the determined light source visibility parameters for the region of the frame being rendered to modulate the effect of the light source in question at each sampling position of the output version of the frame region when rendering an output version of the frame region.

23. The system of claim 13, wherein the graphics processing system is capable of:
    using by processing circuitry the determined light source visibility parameters for the region of the frame being rendered when rendering an output version of the frame region without writing the determined light source visibility parameters out to main memory.

24. The system of claim 13, the graphics processing system is capable of:
    determining by the processing circuitry light source visibility parameters for a frame region for a light source for plural different positions of the geometry in the frame, based on the motion of the geometry during the time interval for the frame.

25. A non-transitory computer readable storage medium storing computer software code which when executing on a processor performs a method of operating a graphics processing system when rendering a frame for output that includes a light source, the method comprising:
    for at least one region of the frame being rendered:
        determining by processing circuitry a set of the geometry to be processed for the frame that could cast a shadow in the frame region being rendered from a light source to be considered for the frame, wherein the set of geometry that could cast a shadow comprises one or more geometry objects that do not form part of the light source; and
        for each sampling position of a set of sampling positions for the region of the frame being rendered, determining by processing circuitry a light source visibility parameter using the determined set of geometry for the frame region that could cast a shadow from the light source;
    wherein the step of determining the set of geometry for the frame region that could cast a shadow from the light source comprises:
        determining one or more light source bounding frustums that contain geometry that is visible in the frame region and the light source being considered;
        determining for geometry objects for the frame that do not form part of the light source, whether or not they intersect at least one of the light source bounding frustums for the frame region; and
        when it is determined that a geometry object for the frame that does not form part of the light source intersects at least one of the light source bounding frustums for the frame region, including that geometry object in the set of geometry for the frame region that could cast a shadow from the light source.

26. A graphics processing system comprising:
    rasterisation circuitry that rasterises input primitives to generate graphics fragments to be processed, each graphics fragment having one or more sampling points associated with it; and
    rendering circuitry that processes fragments generated by the rasterisation circuitry to generate rendered fragment data;
    and wherein the graphics processing system is capable of, when rendering a frame for output that includes a light source:
        for at least one region of the frame being rendered:
            determining by processing circuitry a set of the geometry to be processed for the frame that could cast a shadow in the frame region being rendered from a light source to be considered for the frame, wherein the set of geometry that could cast a shadow comprises one or more geometry objects that do not form part of the light source; and
            for each sampling position of a set of sampling positions for the region of the frame being rendered, determining by processing circuitry a light source visibility parameter using the determined set of geometry for the frame region that could cast a shadow from the light source;
        wherein the step of determining the set of geometry for the frame region that could cast a shadow from the light source comprises:
            determining one or more light source bounding frustums that contain geometry that is visible in the frame region and the light source being considered;
            determining for geometry objects for the frame that do not form part of the light source, whether or not they intersect at least one of the light source bounding frustums for the frame region; and
            when it is determined that a geometry object for the frame that does not form part of the light source intersects at least one of the light source bounding frustums for the frame region, including that geometry object in the set of geometry for the frame region that could cast a shadow from the light source.

* * * * *